United States Patent [19]
Addink et al.

[11] Patent Number: 4,747,985

[45] Date of Patent: May 31, 1988

[54] METHOD FOR THE MANUFACTURE OF A MAGNESIA-CARBON BRICK

[75] Inventors: Jaap H. Addink, Heemskerk; Christian M. J. M. Beelen, Alkmaar; Adam Steen, Heemskerk; Hendrik M. Verhoog, Bennebroek; Jurrie de Boer, Castricum, all of Netherlands

[73] Assignee: Hoogovens Groep B.V., Ijmuiden, Netherlands

[21] Appl. No.: 906,685

[22] Filed: Sep. 11, 1986

Related U.S. Application Data

[63] Continuation of Ser. No. 640,801, Aug. 14, 1984, abandoned.

[30] Foreign Application Priority Data

Aug. 24, 1983 [NL] Netherlands ............... 8302955

[51] Int. Cl.$^4$ ............................................. C04B 35/04
[52] U.S. Cl. .................................... 264/102; 264/120; 264/122; 501/101

[58] Field of Search ............... 501/101; 264/102, 120, 264/122

[56] References Cited

U.S. PATENT DOCUMENTS 4,248,638  2/1981  Yomota et al. ................ 501/101
4,588,420  5/1986  Charvat ........................... 51/298

*Primary Examiner*—James Derrington
*Attorney, Agent, or Firm*—Stevens, Davis, Miller & Mosher

[57] ABSTRACT

A method for the manufacture of a magnesia-carbon brick comprising the steps of:
 a. preparing a mixture comprising:
  1. burned magnesite
  2. carbon
  3. binder solution comprising
   3.1 precondensed novolak resin
   3.2 solvent for the novolak resin
  4. a hardener for the resin
 b. pressing a brick from the said mixture.

6 Claims, 2 Drawing Sheets

METHOD FOR THE MANUFACTURE OF A MAGNESIA-CARBON BRICK

BACKGROUND OF THE INVENTION

1. Field of the Invention

The invention relates to a method for the manufacture of a magnesia-carbon brick, comprising the steps of:
a. preparing a mixture comprising:
   1. burned magnesite
   2. carbon
   3. a binder solution comprising:
      3.1 pre-condensed novolak resin
      3.2 a solvent for this novolak resin.
   4. a hardener for the resin.
b. pressing a brick from the mixture.

The invention also provides bricks produced by the method and a converter having a wear lining consisting at least partly of such bricks.

2. Description of the Prior Art

By a magnesia-carbon brick there is understood a brick based mainly on the components burned magnesite, carbon in the amount of typically 5–30% carbon by weight and a suitable binder. Magnesia-carbon bricks are used in the wear lining of a converter for steel production, and are substantially more resistant to wear than magnesite bricks in which the percentage of carbon used is not so high. The wear lining of a converter can, depending on the price of the bricks, be wholly or partly constructed from magnesia-carbon bricks, especially at the location of the trunnions of the converter, where the wear is greatest.

The invention should be considered against the background of the state of the art, in which it is not possible for an expert to predict either the problems arising in the preparation of bricks or the properties of a brick in dependence on the factors influencing it.

A method of the type described above is disclosed in U.S. Pat. No. 4,248,638. In this known method, the percentage by weight of solvent relative to the weight of novolak resin and solvent together is in the range 20 to 60%. According to the disclosure, with less than 20% solvent it is impossible to prepare the mixture, because the viscosity of the binder solution is more than 400 poise at 25° C.

A problem of this known method is that cracks appear in the bricks after the pressing of the bricks. This is attributed by the present applicant to the presence of much air in the mixture after the mixing of the components for magnesia-carbon bricks, which air is trapped in the bricks during pressing of the bricks and compressed, so that after the bricks are pressed the expansion of the trapped air results in cracking.

SUMMARY OF THE INVENTION

One object of the invention is to provide an improved method for the preparation of a magnesia-carbon brick in which the occurrence of cracks is reduced.

Another object of the invention is to produce a method for the preparation of a magnesia-carbon brick with a high wear-resistance.

The invention consists in the combination of the following features in the carrying out of the method:
1 the preparation of the mixture takes place at an elevated temperature in the temperature range of 30° to 100° C., and
2 there is used a binder solution in which the percentage by weight of the solvent relative to the weight of novolak resin and solvent together is in the range 5 to 30%.

With a low percentage of solvent the adhesive strength of the binder in the mixture is high. In addition to this, the experience of the applicants in practice is that, in order to prepare a homogeneous mixture, the viscosity of the binder solution should be much lower than the above-mentioned 400 poise and not much more than 40 poise. However for a viscosity of 40 poise or less at 25° it would be necessary to use a binder solution with a percentage by weight of solvent of more than 30%. The adhesive strength of the binder is then not high enough to prevent cracking. By preparing this mixture at a higher temperature combined with using a low solvent percentage in the binder solution as proposed by the invention, a homogeneous solution with a sufficient adhesive strength is obtained.

The adhesive strength of the binder is sufficiently high to prevent cracking, while the mixture is sufficiently homogeneous, i.e. the binder is distributed through the mixture with sufficient homogeneity to avoid weak areas in the brick where cracking could first occur. Cracking is thus reduced by the combination of the conditions proposed by the invention.

The use of solvent, and more particularly the use of much solvent, has the consequence that later during heat treatment of the bricks after pressing or during commissioning of a converter with a lining constructed with bricks which have not been heat-treated, the solvent evaporates. This evaporation increases the final porosity of the bricks and weakens the carbon matrix in the bricks, so that the wear-resistance of the bricks is reduced. With the low percentage of solvent which is used in the process according to the invention, there is obtained a brick with low porosity and a strong carbon matrix which is very wear-resistant.

At a temperature of less than 30° C., the quantity of solvent cannot be significantly reduced, while at a temperature of more than 100° C., depending somewhat on the choice of hardener, the cross-linking of the resin is already under way during preparation of the mixture, i.e. before the pressing of the bricks is yet under way. When using a quantity of solvent less than 5%, depending somewhat on the choice of solvent, it is no longer possible to prepare a homogeneous mixture, while cracking occurs with a quantity of solvent greater than 30%.

The percentage by weight of solvent is preferably in the range 5 to 20%. The preparation of the mixture preferably takes place at an elevated temperature in the temperature range 45° to 100° C., preferably below 90° C. With these preferred conditions, the risk of cracking is very low and very good wetting of the mixture by the binder solution is obtained.

It is preferred that when the brick is being pressed from the mixture, first the applied pressure is raised in one or more steps to a level in the range 10 to 70% of the full pressure (i.e. the maximum pressure applied during pressing) the pressure being substantially removed after each such step for a time to degas the mixture, and thereafter the full pressure is applied. Furthermore, the mixture in the mould is preferably also subjected during pressing to sub-atmospheric pressure, e.g. by connecting the brick mould to a vacuum system. By these measures, in which the trapped air is at least partly removed during pressing, the risk of cracking is further reduced and a brick with a higher apparent density can be obtained.

The pressing of the brick from the mixture is preferably carried out at an elevated temperature in the range 30° to 100° C., preferably below 90° C. The mixture is better compacted at elevated temperature than at room temperature, so that bricks of higher density are obtained and the bricks can be pressed directly after preparation of the mixture. Using the above-stated preferred conditions the risk of cracking is small.

The invention also provides a converter for the manufacture of steel having a wear lining which at least partly consists of magnesia-carbon bricks manufactured by the method of the invention. Such a lining may be made of green magnesia-carbon bricks produced by the method of the invention, i.e. bricks that have not been subjected to a heat-treatment for instance for drying (to drive out the solvent) or curing (to improve the hot crushing strength) the bricks.

U.S. Pat No. 4,248,638, the contents of which are incorporated herein by reference, discloses details of solvents, novolak resins, carbon and hardeners which may be used in the practice of the present invention.

BRIEF INTRODUCTION OF THE DRAWINGS

A non-limitative example of a process and a converter constituting a preferred embodiment of the invention will now be given, with reference to the accompanying drawings, in which.

EXAMPLE OF THE INVENTION 800 mm long magnesia carbon bricks were manufactured by pressing from a mixture consisting of (by weight):

80% burned magnesite
15% natural flake graphite (carbon)
4.5% binder solution
0.5% hexamethylene tetramine (hardener)

The binder solution was:

85% pre-condensed novolak resin
15% solvent for this novolak resin

The chemical composition of the burned magnesite was:

MgO 98.0–99.0%
CaO 0.5–0.7%
SiO$_2$ 0.1–0.2%
Fe$_2$O$_3$ 0.4–0.5%
Al$_2$O$_3$ 0.4–0.5%

Mixing temperature was in the range of 80° to 85° C.

The temperature of the mixture during pressing of the bricks was also in the range of 80° to 85° C.

The final pressure of 1200 kg/cm$^2$ in the pressing was reached in a three step procedure, after each step the pressure being substantially removed for some time to degas the mixture. The applied pressure was increased at each step. and the pressure applied in the first two steps were in the range of 10 to 70% of the final pressure.

Some characteristic values for the physical properties of the bricks so produced are given in the Table (for comparison, values for conventional tempered magnesite brick are also given).

TABLE

| | Magnesia carbon brick of the Example | conventional tempered magnesite brick |
|---|---|---|
| Cold crushing strength (N/mm$^2$) | >25 | |
| Cold crushing strength after tempering (N/mm$^2$) | — | >45 |
| Hot crushing strength (N/mm$^2$) | | |
| at 100° C. | >4 | 1.9–2.1 |
| 200° C. | >20 | 0.46–0.57 |
| 300° C. | >20 | 0.16–0.20 |
| 400° C. | >20 | 0.26–0.27 |
| 500° C. | >20 | 6.0–6.4 |
| Before firing | | |
| Bulk density (kg/m$^3$) | 2880–2920 | 3020–3070 |
| porosity (%) | 2.0–5.0 | 3.5–5.0 |
| After firing (4 h at 1500° C.) | | |
| Bulk density (kg/m$^3$) | 2400–2500 | 2900–2950 |
| porosity (%) | 27.0–30.0 | 14.0–16.0 |
| residual carbon (%) | >16 | 3.9–4.5 |

Figure 1A:
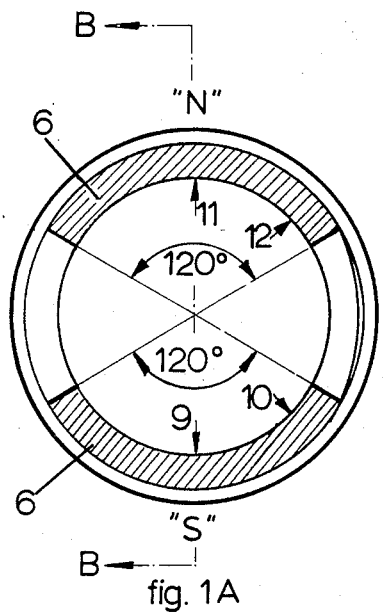
FIGS. 1A and 1B are respectively schematic horizontal and vertical sections of a steel converter embodying the invention, used in a campaign.
Figure 1B:
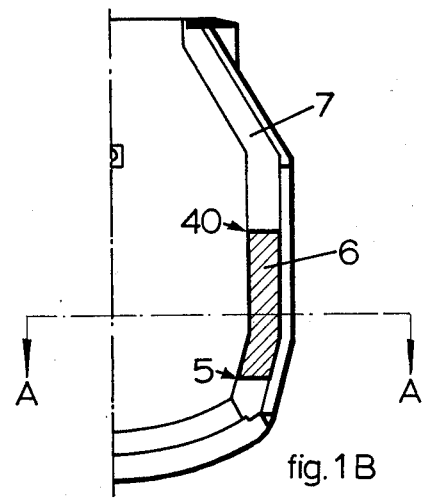

120 tons of the magnesia carbon bricks of the Example were, without heat treatment, used in a wear lining 7 of a 300 ton converter for steelmaking to form panels 6 as shown in FIGS. 1A and B at the regions of heaviest wear at the trunnions of the converter at "N(orth)" and "S(outh)" in FIG. 1A, these being trunnions on which the converter is tilted during use. The panels were 120 degrees wide each and extended in height from the fifth to the fortieth layer of bricks of the converter side wall. For the rest of the wear lining, 392 tons of conventional tempered tarbonded magnesite bricks were used.

Figure 2:
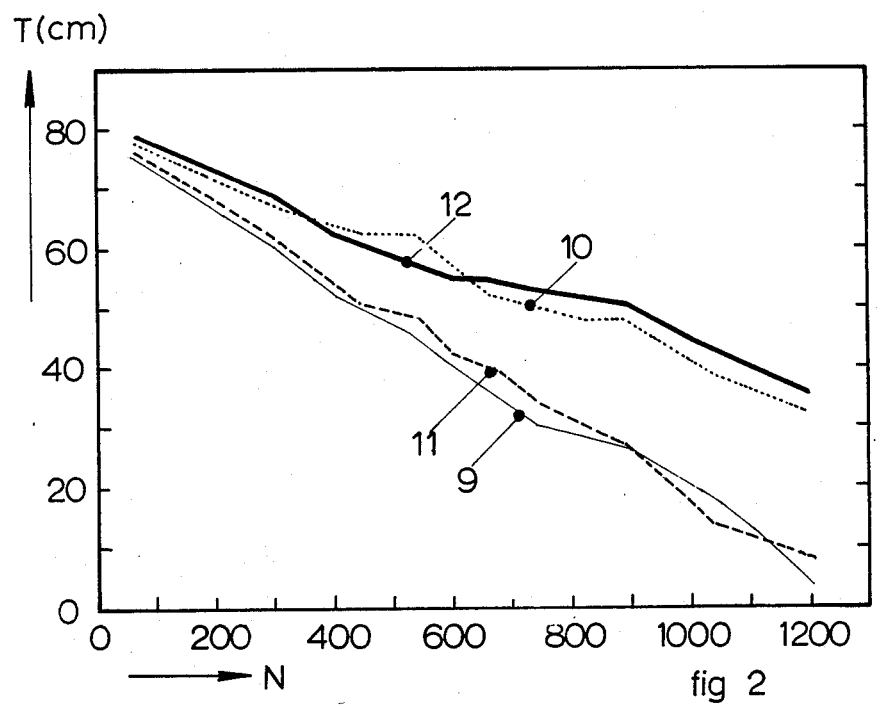
FIGS. 2 and 3 are graphs representing the lining conditions during the campaigns.

The converter thus lined was used during a campaign called the C-campaign. During this use the wear of the wear lining was measured at positions 9,10,11 and 12 shown in FIG. 1A, using laserbeam measurements. Results are shown in FIG. 2 in which the residual thickness T in cm at positions 9,10,11 and 12 is plotted against the number of heats n. The residual thickness T plotted is the lowest value determined in a vertical section.

Figure 1C:
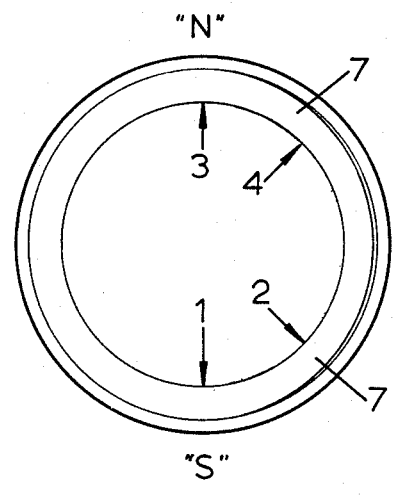
FIGS. 1C and 1D are views, corresponding to those of FIGS. 1A and 1B, of the same converter in a previous campaign.
Figure 1D:
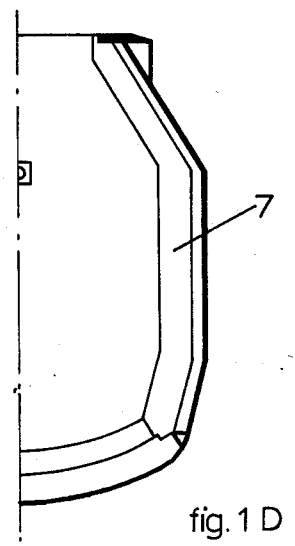
Figure 3:
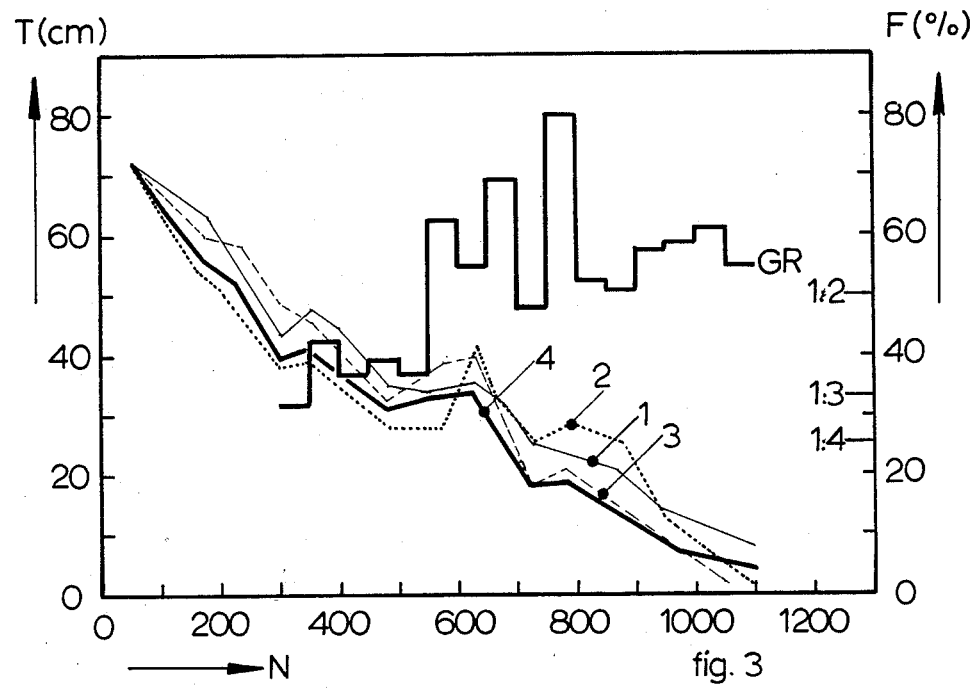

The results of FIG. 2 are compared with thickness measurements represented in FIG. 3 of the same converter during the preceding B-campaign in which the whole wear lining 7 consisted of 517 tons of 800 mm conventional tempered tarbonded magnesite bricks as shown in FIGS. 1C and 1D. In the B-campaign the thickness of the wear lining was measured at positions 1,2,3 and 4 shown in FIG. 1C. These positions correspond to positions 9,10,11 and 12 in FIG. 1A.

In FIG. 3 the frequency of gunning repair F (%) is represented by a line marked GR. In the B-campaign gunning repair started after 300 heats. The frequency of gunning soon became once every two heats. B-campaign was terminated after 1102 heats. For the B-campaign, material consumption was 1.67 kg of magnesite bricks and 0.70 kg of gunning material per ton of steel.

In the C-campaign, no gunning was employed. The converter was taken out of service after 1170 heats. The consumption of the C-campaign was 1.08 kg of magnesite bricks and 0.33 kg of magnesia carbon bricks per ton of steel.

It will be clear that there were no gunning costs with the magnesia carbon balanced wear lining of the C-campaign and that converter availability was much better.

What is claimed is:

1. A method for reducing crack formation and increasing wearability of a magnesia-carbon brick consisting of preparing a mixture at a temperature of from 45° to 100° C. comprising:
   1. burned magnesite
   2. carbon
   3. binder solution comprising
      (a) precondensed novolak resin
      (b) solvent for the novolak resin and
   4. a hardener for the resin and pressing a brick from said mixture directly after preparation of said mixture at a temperature of from 30° to 100° C., said solvent for the novolak resin being present in said binder solution in a range of 5 to 20% based on the weight of said novolak resin and solvent together.

2. A method according to claim 1 including during the said pressing of the brick from the mixture, first raising the applied pressure in at least one step to a level in the range of 10 to 70% of the full pressure and substantially removing the pressure for a time after each said pressure-raising step to degas the mixture and thereafter applying the said full pressure.

3. A method according to claim 1 wherein the mixture is pressed in a mould to form the brick, including the step of subjecting the mixture in the mould to a sub-atmospheric pressure during pressing of the brick.

4. A method for the manufacture of a magnesia-carbon brick consisting of:
   a. preparing a mixture comprising:
      1. 80% burned magnesite
      2. 15% natural flake graphite
      3. 4.5% binder solution comprising
         (a) 85% precondensed novolak resin
         (b) 15% solvent for said novolak resin
      4. 0.5% hexamethylene tetramine and
   b. pressing a brick from said mixture, said preparation of said mixture being at a temperature of from 80°–85° C. and said pressing being at a temperature of from 80°–85° C.

5. A method according to claim 4 including during the said pressing of the brick from the mixture, first raising the applied pressure in at least one step to a level in the range of 10 to 70% of the full pressure and substantially removing the pressure for a time after each said pressure-raising step to degas the mixture and thereafter applying the said full pressure.

6. A method according to claim 4 wherein the mixture is pressed in a mold to form the brick, including the step of subjecting the mixture in the mold to a sub-atmospheric pressure during pressing of the brick.

* * * * *